United States Patent
Roy

(10) Patent No.: US 7,925,917 B1
(45) Date of Patent: Apr. 12, 2011

(54) SYSTEMS AND METHODS FOR ENABLING FAILOVER SUPPORT WITH MULTIPLE BACKUP DATA STORAGE STRUCTURES

(75) Inventor: Larry Stephen Roy, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 259 days.

(21) Appl. No.: 12/061,924

(22) Filed: Apr. 3, 2008

(51) Int. Cl.
*G06F 11/00* (2006.01)

(52) U.S. Cl. .................................. 714/5; 714/6
(58) Field of Classification Search .................. None
See application file for complete search history.

(56) References Cited

U.S. PATENT DOCUMENTS

| | | | |
|---|---|---|---|
| 2001/0032182 A1 | 10/2001 | Kumar et al. | |
| 2003/0191711 A1 | 10/2003 | Jamison et al. | |
| 2005/0065882 A1 | 3/2005 | Remington et al. | |
| 2007/0005496 A1 | 1/2007 | Cataline et al. | |
| 2007/0079171 A1* | 4/2007 | Aidun ................... | 714/6 |
| 2007/0234108 A1* | 10/2007 | Cox et al. ............... | 714/6 |
| 2008/0301492 A1* | 12/2008 | Honda et al. ............ | 714/6 |
| 2009/0240975 A1* | 9/2009 | Shitomi et al. .......... | 714/5 |

OTHER PUBLICATIONS

AllianceData. "Utility Payment Processing". Retrieved from the internet: <http://www.alliancedata.com/oursolutions/businessprocessoutsourcing/utilitypaymentprocessing.html/>. © 2001-2007 ADS Alliance Data Systems, Inc. 17655 Waterview Parkway Dallas, TX.

* cited by examiner

*Primary Examiner* — Michael C Maskulinski
(74) *Attorney, Agent, or Firm* — Brooks, Cameron & Huebsch, PLLC

(57) ABSTRACT

A main data center with first and second backup data centers also has a translator for assisting a failover module of a failed server at the main data center in implementing failover of the failed server to a corresponding server at the first backup data center. The translator intercepts a command from the failover module to a store of the main data center, where the command directs the store to disable writes to particular storage space in the store associated with the failed server, but does not identify with specificity which of a store of the first data center and a store of the second data center is enabled to write to such particular storage space. Thus, the translator determines an identification of the store of the first backup data center, and modifies the command from the failover module based on the determined identification.

18 Claims, 5 Drawing Sheets

SYSTEMS AND METHODS FOR ENABLING FAILOVER SUPPORT WITH MULTIPLE BACKUP DATA STORAGE STRUCTURES

CROSS-REFERENCE TO RELATED APPLICATION(S)

The present application is filed concurrently with and shares a common title and disclosure with the following applications, each of which is hereby incorporated herein by reference in its entirety:
   U.S. patent application Ser. No. 12/061,928, and
   U.S. patent application Ser. No. 12/061,936.

FIELD

The present disclosure is directed to systems and methods that enable failover support for a data storage structure. More particularly, the present disclosure is directed to such systems and methods that are applicable in cases where the data structure is a primary data structure that has multiple backup data structures at which a copy of the data at such data structure is maintained. Even more particularly, the present disclosure is directed to such systems and methods where the primary data structure allows itself to be disabled only if a particular backup data structure is concurrently enabled, but where a command to so disable and enable is not specific as to which backup data structure is to be enabled.

BACKGROUND

It is known that electronic data may be stored and/or maintained in a data storage structure. Examples of such a data storage structure are many and varied, and can range from a removable storage drive or a non-removable hard drive on a computing device, to a hard drive or a data server in a local network, to a collection of data servers in a larger network, and even to a storage area network (SAN) in a very large network. It is also known that a copy of a (primary) data structure can be maintained as a backup data structure in case for some reason the primary data structure becomes disabled or is otherwise determined to be unfit for the purpose thereof.

For example, a primary data structure may have a corresponding backup data structure in the event that the primary data structure is determined to have failed, in the event that communications access to the primary data structure is determined to have deteriorated, or the like. More concretely, if the primary data structure is a hard drive, it may be that the hard drive suddenly takes much longer to respond to an access request, which is taken as an indication that the hard drive is about to fail. Similarly, if the primary data structure is a server, it may be that the server responds to storage requests with error notices, which likewise is taken as an indication that the server is about to fail. In either instance, proactive measures are taken to replace use of the primary data structure by actuating the backup data structure in place of the replaced primary data structure. Examples of other events in which a backup data structure is actuated are many and varied and are generally known.

Notably, multiple backup data structures can be maintained for each primary data structure. Purposes for doing so are many and varied. For one example, data storage may be so critical to an organization that the organization is not satisfied with having merely one backup data structure. For another example, an organization may maintain different backup data structures for different purposes. Especially in the latter case, it may be that the organization maintains a first backup data structure for normal backup purposes, in which case such first backup data structure is typically relatively local with respect to the primary data structure, and that the organization maintains a second backup data structure for disaster recovery purposes, in which case such second backup data structure is typically relatively remote with respect to the primary data structure and the first backup data structure.

As may be appreciated, the organization may employ the first, local backup data structure in the course of relatively normal day-to-day operations, such as for example when the primary data structure is being disabled for normal maintenance, or when the primary data structure is acting aberrantly and is disabled in the course of repairing same. Thus, the first, local backup data structure may be in relatively close and synchronous communications with the primary data structure so as to mirror same. Correspondingly, the organization may employ the second, remote backup data structure in the course of relatively extraordinary circumstances, such as for example when the primary data structure and the first, local backup data structure are both disabled, perhaps because of an extraordinary event such as an extended and wide-spread power outage, a weather event such as a hurricane, a catastrophic loss of both the building in which the primary data structure is located and the building in which the first, local backup data structures are located, and the like. Thus, the second, remote backup data structure may be in relatively far and asynchronous communications with the primary data structure, perhaps missing a few seconds to a few minutes of the most recent data thereat.

In at least some systems, a primary data structure will not allow itself to be disabled unless one of the backup data structures is enabled. As may be appreciated, such a requirement ensures that access to a data structure is ensured, be it the primary data structure or a backup data structure thereof. However, such a requirement is also problematic in at least some circumstances, especially when the primary data structure has multiple backup data structures and requires an identification of the particular backup data structure that is being enabled. In particular, while the primary data structure is capable of discerning between individual ones of the multiple backup data structures thereof, the entity that is commanding the disabling and enabling may not likewise be capable of such discernment. Instead, such an entity may merely presume that a single backup data structure is extant, and thus not bother to identify the backup data structure being enabled with any specificity.

Accordingly, a need exists for systems and methods for identifying the backup data structure being enabled with specificity. More particularly, a need exists for such systems and methods that receive a disabling and enabling command and modify such command to provide such specificity. Even more particularly, a need exists for such systems and methods that discern the backup data structure being enabled, and based thereon so modify the command from the entity.

SUMMARY

The aforementioned needs are satisfied at least in part by a system and method implemented in connection with a data system that has multiple data centers including a main data center, a first backup data center, and a second backup data center. Each data center includes a plurality of servers for processing data and a store for storing the processed data. Each server of the main data center includes a failover module for providing failover support to the server. The main data center also has a translator for assisting a failover module of a failed server at the main data center in implementing failover of the failed server to a corresponding server at the first backup data center.

The translator intercepts a command from the failover module of the failed server to the store of the main data center, where the command directs the store of the main data center to disable writes to particular storage space in the store of the main data center associated with the failed server, but does not identify with specificity which of the store of the first data center and the store of the second data center is enabled to write to such particular storage space. Thus, the translator determines an identification of the store of the first backup data center, and modifies the command from the failover module of the failed server to the store of the main data center based on the determined identification of the store of the first backup data center, where the modified command directs the store of the main data center to disable writes to the particular storage space in the store of the main data center associated with the failed server, and identifies with specificity that the store of the first backup data center is enabled to write to such particular storage space. Thereafter, the translator transmits the modified command to the store of the main data center as if such modified command were sent directly by the failover module, and the store of the main data center can proceed in accordance with the modified command.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
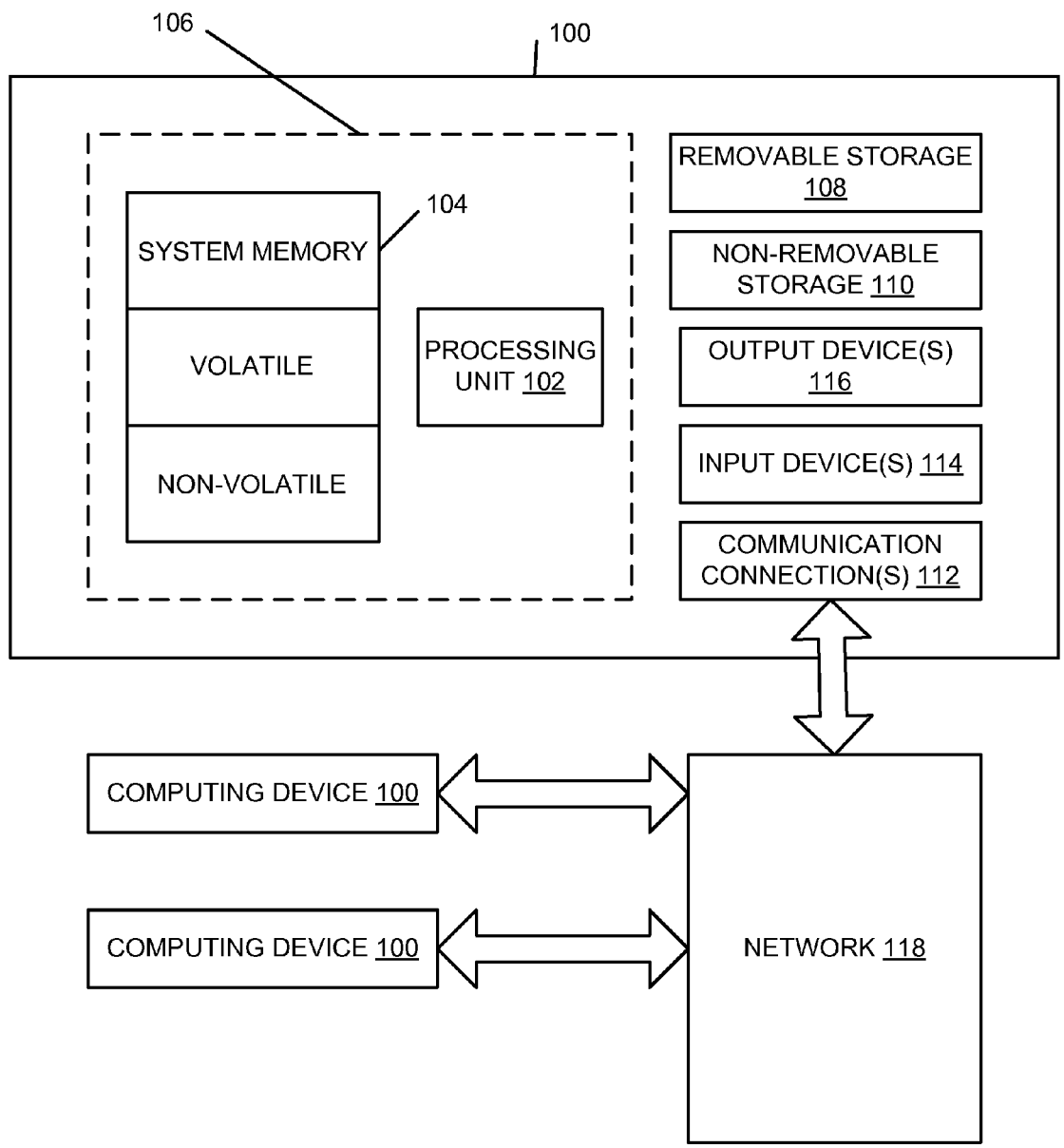
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Failover Support

Figure 2:
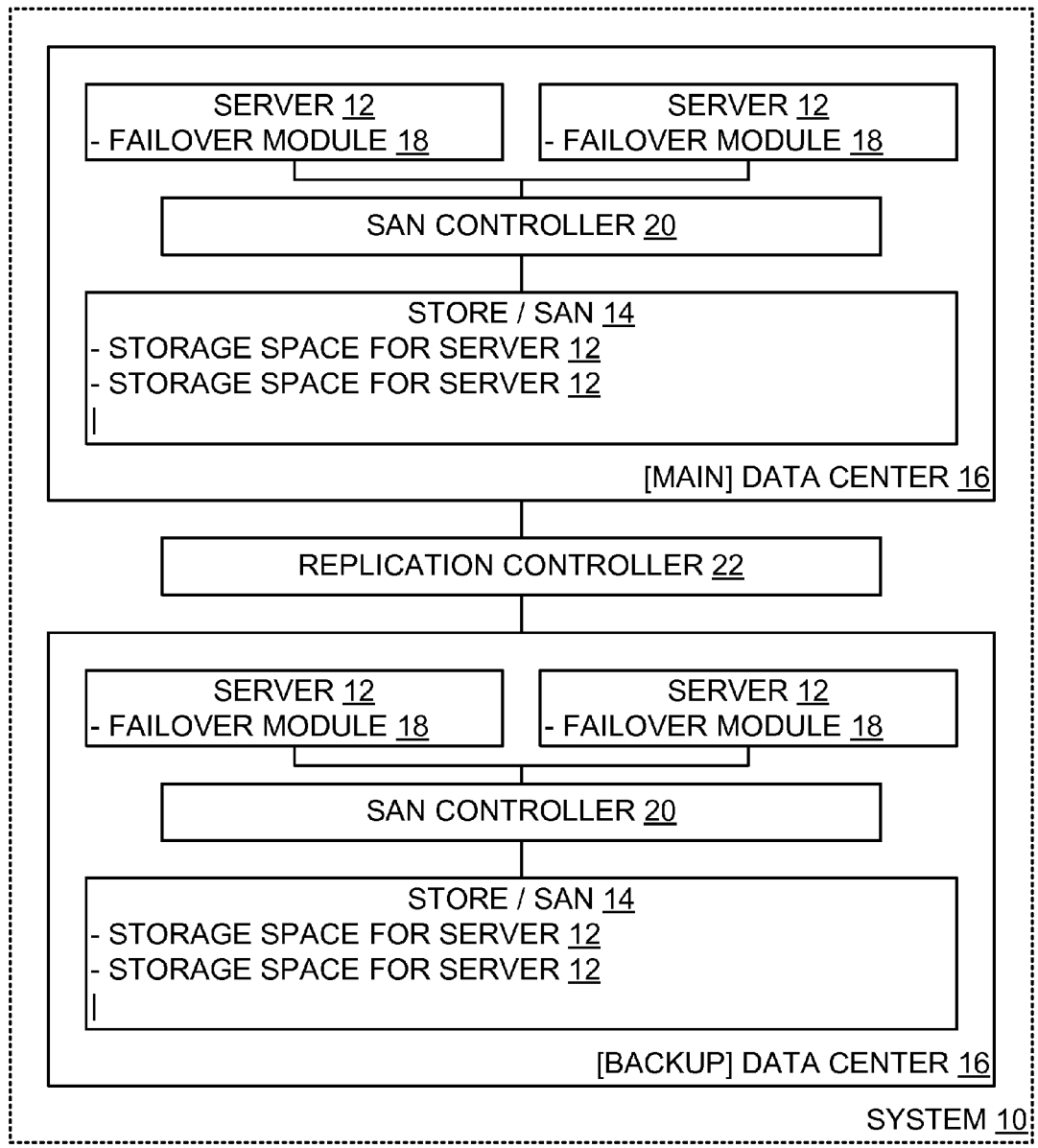
FIG. 2 is a block diagram of a data system including a main data center and a backup data center.

Turning now to FIG. 2, it is seen that in one typical scenario, a data system 10 is provided for processing and/or storing data, where the system 10 includes at least one server 12 and a data storage structure (hereinafter, 'store') 14 employed by the server 12 at a data center 16 or the like. As may be appreciated, such system 10, server 12, store 14, and center 16 may be most any particular system, server, store, and center without departing from the spirit and scope of the present innovation. That said, it is likely in the context of the present innovation that such system 10 will be operated by a relatively large organization with relatively large data processing and storing needs, in which case the data center 16 of the system 10 will have numerous servers 12, and also that the store 14 will be relatively large, perhaps on the order of terabytes if not larger.

As is known, each server 12 of the system 10 and center 16 of FIG. 2 includes failover support so as to transfer processing from one server 12 to a backup server 12 in the event that the one server 12 is removed from the processing functions thereof. Such reasons for removal are many and known, and can include failure of the server 12, a determination that the server 12 is about to fail, a determination that the server 12 has become partially disabled, disabling of the server 12 for maintenance, and the like. As is typical, each server 12 includes a failover support module 18 for monitoring the server 12 for failures and the like, for declaring a failure of the server 12 when detected, and also for actuating a failover of services performed by the server 12 to a backup server 12 in an orderly fashion. Thus, the backup server 12 takes over the services performed by the failed server 12 in what should be an all but seamless and unnoticeable manner. Such a failover module 18 is typically software-based, and is known or should be apparent to the relevant public and therefore need not be set forth herein in any detail other than that which is provided. One typical software system including such a failover module 18 is VERITAS data center software as provided by SYMANTEC Corporation of Cupertino, Calif.

Particularly if the store 14 of the center 16 of the system 10 is relatively large, such store 14 may be configured as a data farm such as a storage area network (SAN). Such a store/SAN 14 may for example include a disk array within which data is actually stored, as well as controlling software and/or hardware for controlling and monitoring such disk array. Such a SAN 14 is generally known or should be apparent to the relevant public, and therefore need not be set forth herein in any detail other than that which is provided. One typical software system for configuring and controlling such a SAN 14 is provided by EMC Corporation of Hopkinton, Mass.

Notably, each server 12 of the center 16 is assigned a particular storage space within the SAN 14. Accordingly, once a server 12 has failed over to a backup server 12, the SAN 14 must be notified that the storage within the SAN 14 previously employed by the failed server 12 is now to be employed by the backup server 12. In particular, then, the failover module 18 of the failed server 12 as part of a failover issues a command to a SAN controller 20 associated with the SAN 14, where the command directs the SAN controller 20 to re-assign the storage space of the failed server 12 to the backup server 12, and the SAN controller 20 based on the issued command in fact actuates such re-assignment of the storage space of such SAN 14.

As was noted above, and still referring to FIG. 2, the data center 16 including the servers 12 and SAN 14 thereof may be replicated so that the organization includes a system 10 with a main data center 16 and a backup data center 16, as is shown. Essentially, the backup data center 16 has its own servers 12 and store/SAN 14, is organized in a manner similar to that of the main data center 16, and stands by to act in the place of the main data center 16 should the main data center 16 become disabled or otherwise unavailable. As was alluded to above, use of such a backup data center 16 occurs in organizations where the data thereof is especially critical, as is the access thereto. For example, in a large insurance-based business, continuous access to data relating to insurance policies and the like may be deemed to be mission-critical such that the data must be accessible essentially at all times. Thus, it is simply not acceptable if the data becomes non-accessible because the data center 16 having such data becomes disabled, even if such disablement occurs for a few minutes, let alone for hours, days, or even weeks. Instead, access to such data is maintained by copying or 'mirroring' such data to a backup data center 16 that is hopefully available should the main data center 16 in fact become disabled.

Mirroring data between a main data center 16 and a backup data center 16 is generally known or should be apparent to the relevant public, and therefore need not be set forth herein in any detail other than that which is provided. Essentially, the main and backup data centers 16 are coupled by way of an appropriate communications link and a replication controller 22, where the replication controller 22 ensures that all data at the SAN 14 of the main data center 16 is also at the SAN 14 of the backup data center 16. Typically, the main and backup data centers 16 are physically separated so that a catastrophic event such as a fire at the main data center 16 would typically not affect the backup data center 16. However, the main and backup data centers 16 are relatively local to each other so that synchronous high speed data communications can occur therebetween. Accordingly, the replication controller 22 ensures that the data at the backup data center 16 is all but identical to the data at the main data center 16. As a result, the backup data center 16 can take over from the main data center 16 in an all but seamless and unnoticeable manner and without loss of any data.

Normally, then, as the main data center 16 is operating, data stored at the SAN 14 of the main data center 16 is being backed up to the SAN 14 of the backup data center 16. In addition, appropriate interfacing links (not shown) keep the servers 12 at the backup data center 16 apprised of the services being performed by the corresponding servers 12 at the main data center 16 such that such servers 12 at the backup data center 16 can take over from the servers 12 at the main data center 16 in an expeditious manner if and when need be. Note, though, that the servers 12 at the backup data center 16 are not actually operating on the data at the SAN 14 of the backup data center 16 when the main data center 16 is operational and not disabled.

However, with all the available capacity of the servers 12 at the backup data center 16, it would be a waste to leave such servers 12 idle except for the rare instances when the main data center 16 is disabled. Moreover, from an operational point of view, such servers 12 at the backup data center 16 should be employed at least enough to ensure that such servers 12 when employed are in good operating condition. Accordingly, it is known that when a server 12 at the main data center 16 fails over, the services as performed by the failed server 12 may be taken up by a corresponding server 12 at the backup data center 16. Note that in the instance where a server 12 at the backup data center 16 operates on data at the SAN 14 of the backup data center 16 to modify same, such modified data is mirrored back to the SAN 14 at the main data center 16. Effectively, then, the backup data center 16 performs both a backup function for the main data center 16 and also a failover function for servers 12 at the main data center 16.

Failover Support with Multiple Backup Data Centers 16

Figure 3:
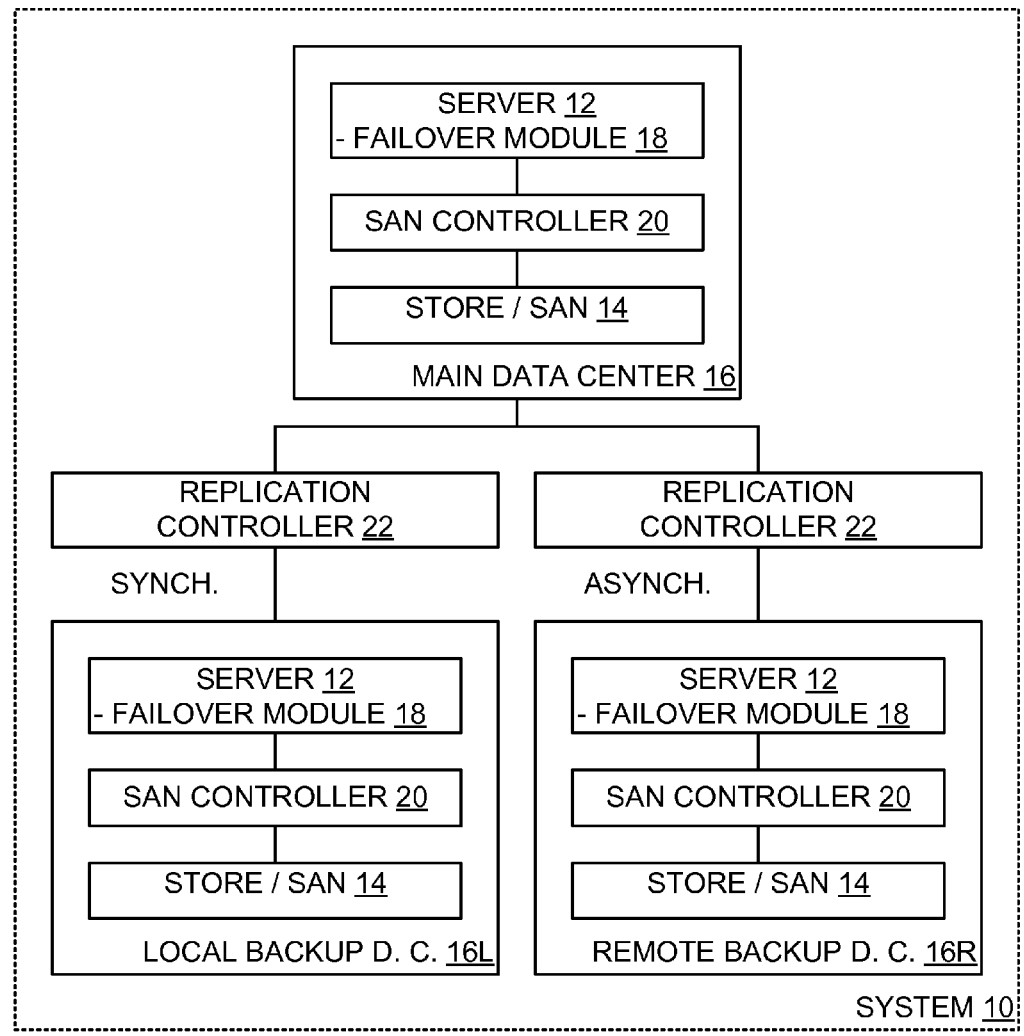
FIG. 3 is a block diagram of a data system such as that of FIG. 2 but with local and remote backup data centers in accordance with various embodiments of the present innovation.

Turning now to FIG. 3, it is to be appreciated that in addition to a backup data center 16 that is relatively local to the main data center 16, an organization may employ an additional backup data center 16 that is relatively remote from the main data center 16 and also the (local) backup data center 16. As was alluded to above, the remote backup data center 16R can be provided for disaster recovery purposes that are not addressed merely by the local backup data center 16L. For example, although the local backup data center 16L might not be affected if the main data center 16 were to be disabled by a fire, the same might not be true if both the main and local backup data centers were struck by a hurricane or an extended and wide-spread power outage.

Typically, then, the main and remote backup data centers 16 are physically widely separated so that a catastrophic event that could disable both the main and local backup data centers 16 would likely not also disable the remote backup data center 16R. Thus, the main and remote backup data centers 16 might be 200 or 300 miles apart, if not more, and might be sited in physically dissimilar regions, among other things. Note, though, that by being physically widely separated, synchronous high speed data communications likely cannot occur over such distances. Instead, asynchronous high speed data communications are employed between the main and remote backup data centers 16. Accordingly, the replication controller 22 between the main and remote backup data centers 16 cannot ensure that the data at the remote backup data center 16R is all but identical to the data at the main data center 16. Instead, the data at the remote backup data center 16R might be as much as a minute or more older than the same data at the main data center 16, although such a lag is not believed to be especially serious. The remote backup data center 16R can take over from the main data center 16 with only a small loss that has been deemed acceptable under the circumstances.

To summarize thus far, in the system 10 of FIG. 3, each server 12 at the main data center 16 is replicated or at least able to be replicated at the local backup data center 16L or the remote backup data center 16R, and the SAN 14 at the main data center 16 is replicated both to the SAN 14 at the local backup data center 16L and the SAN 14 at the remote backup data center 16R. Additionally, when a server 12 at the main data center 16 fails over, the services of such failed over server 12 may be taken up by a corresponding server 12 at the local backup data center 16L without data loss. Note here that such services would not normally be taken up at the remote backup data center 16R due to the possibility of data loss thereat.

To actuate such a failover of a server 12 at the main data center 16 to a server 12 acting as a backup at the local backup data center 16L, the failed server 12 includes a failover module 18 which issues a command by way of an appropriate communications link to the backup server 12 at the local backup data center 16L to in fact take up the services formerly provided by the failed server 12 at the main data center 16. Such a command is generally known and need not be set forth herein in any detail other than that which is provided. In addition, the failover module 18 of the failed server 12 at the main data center 16 issues commands to each of the SAN controller 20 associated with the SAN 14 of the main data center 16 and the SAN controller 20 associated with the SAN 14 of the local backup data center 16L, where the command to the SAN controller 20 associated with the SAN 14 of the main data center 16 directs same to disable writes to the storage space of the failed server 12, and where the command to the SAN controller 20 associated with the SAN 14 of the local backup data center 16L directs same to enable writes to the same storage space at the SAN 14 thereof. As a result, the backup server 12 at the local backup data center 16L can employ the data of the failed server 12 at the SAN 14 of such local backup data center 16L.

However, and as was alluded to above, in at least some systems 10, each SAN controller 20 will not accept a command to disable writes to particular storage space of a particular server 12 unless the command also identifies another SAN 14 that enables writes to the particular storage space of the particular server 12. As may be appreciated, and again, such a requirement ensures that write access to the storage space exists at a SAN 14 in the system 10. Additionally, such a requirement is also employed to ensure that write access to the storage space exists at exactly one SAN 14 in the system 10. Thus, the command from the failover module 18 to the SAN controller 20 associated with the SAN 14 of the main data center 16 both directs same to disable writes to the storage space of the failed server 12 at the main data center 16, and also identifies that the SAN 14 at 'the backup data center 16' is enabled to write to such storage space.

That is to say, in such a situation, the failover module 18 only identifies that the write-enabling SAN 14 is at 'the backup data center 16', and not either the SAN 14 at the local backup data center 16L or the SAN 14 at the remote backup data center 16R. Put simply, the failover module 18 issuing the command in such a situation was not designed to accommodate the possibility of more than one backup data center 16, and cannot discern between individual ones of the multiple backup data centers 16. Instead, the failover module 18 in such a situation is designed to presume that a single backup data center 16 is extant, and thus does not bother to identify the backup data center 16 being write-enabled with any specificity. As should be understood, without such specificity, the command will fail at the SAN controller 20 inasmuch as the SAN controller is aware of a SAN 14 at the local backup data center 16L and at the remote backup data center 16R.

Note here that the failover module 18 issuing such command should be assumed to mean to identify the local backup data center 16L and not the remote backup data center 16R, especially inasmuch as failovers to the remote backup data center 16R do not occur. However, such SAN controller 20 likely cannot be altered to accommodate such an assumption, and the failover module 18 has not heretofore been altered to specify the local backup data center 16L.

Figure 4:
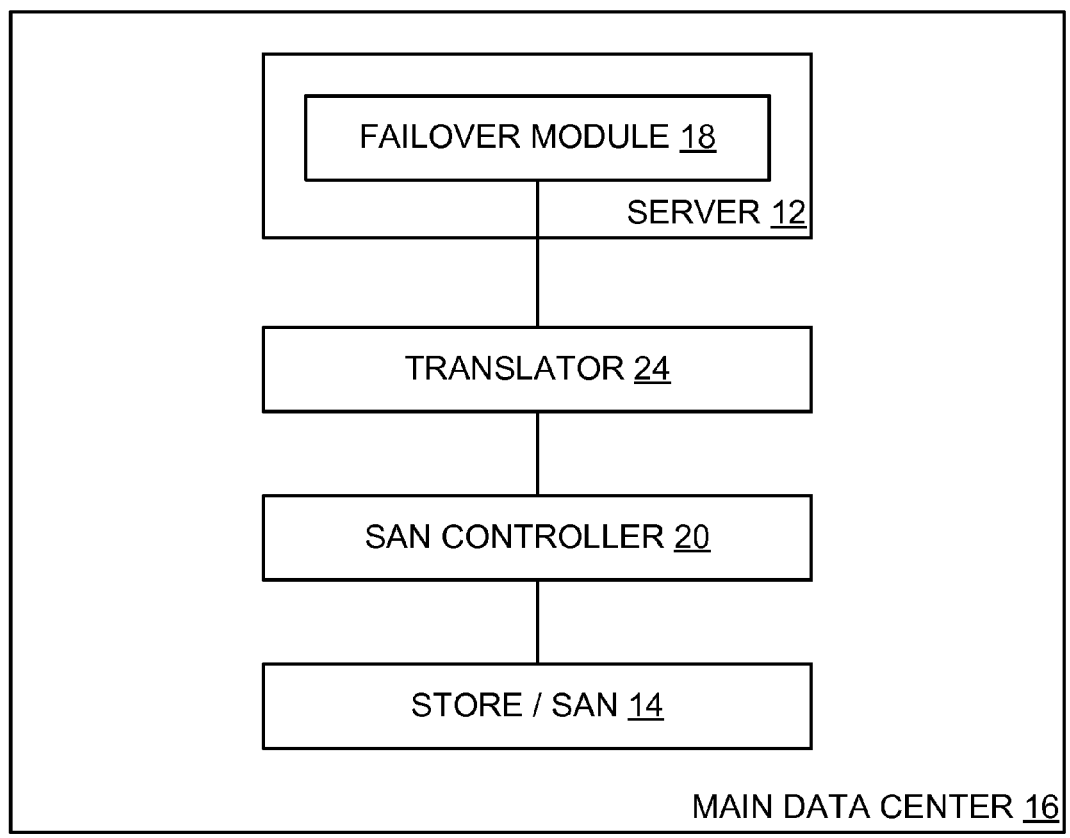
FIG. 4 is a block diagram showing a translator included in the data system of FIG. 3 in accordance with various embodiments of the present innovation.

Accordingly, and in various embodiments of the present innovation, and turning now to FIG. 4, a translator 24 is provided to translate the command from the failover module 18 to the SAN controller 20 associated with the SAN 14 of the main data center 16, such that the command both directs same to disable writes to the storage space of the failed server 12, and also identifies that the SAN 14 at the local backup data center 16L is enabled to write to such storage space. As seen in FIG. 4, such a translator 24 is interposed between the failover module 18 and the SAN controller 20, and is likely associated more closely with the SAN controller 20 than the failover module 18, especially inasmuch as there are likely many failover modules 18 but only one SAN controller 20. Generally, all commands from the failover module 18 to the SAN controller 20 pass through the translator 24, and commands that disable writes to the storage space of a server 12 are scrutinized for further action.

Figure 5:
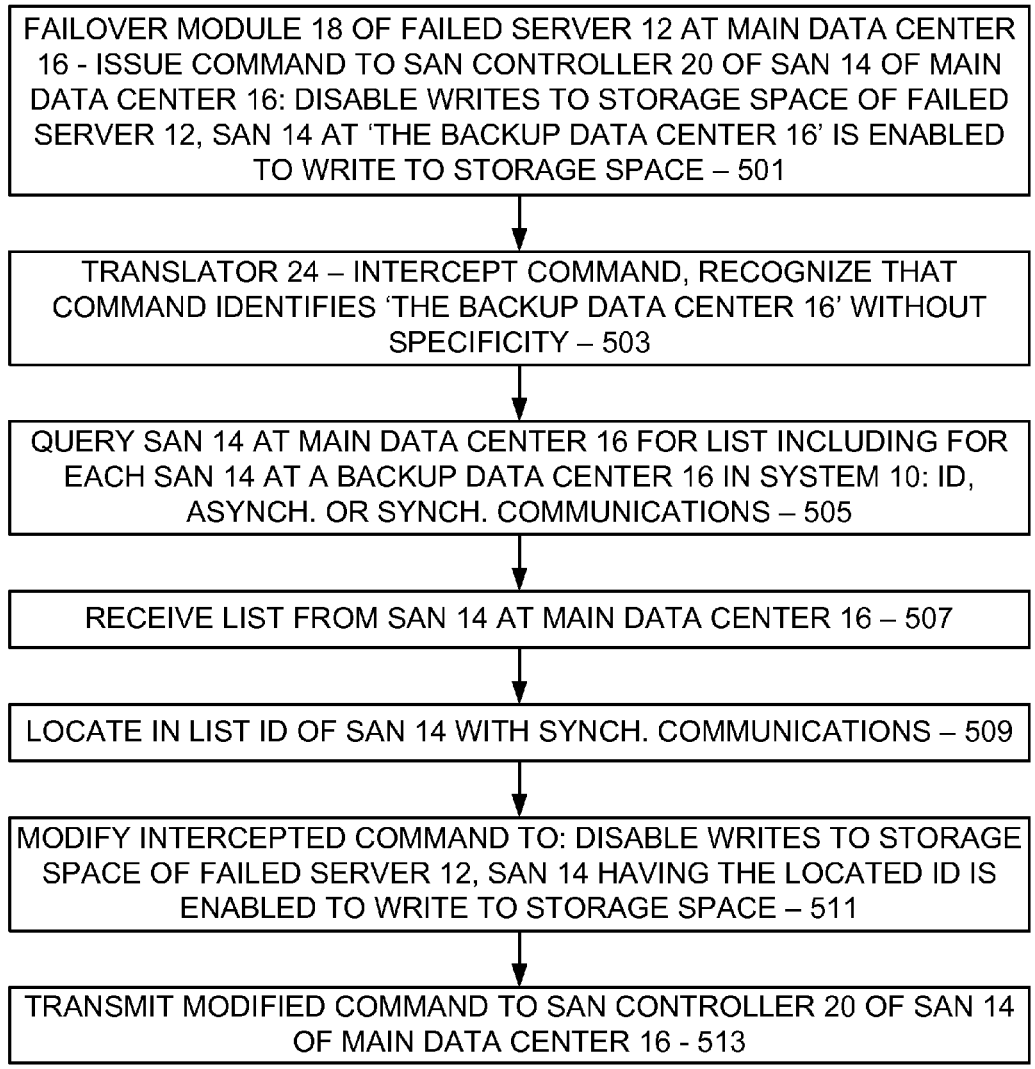
FIG. 5 is a flow diagram showing key actions performed in connection with the translator of FIG. 4 in accordance with various embodiments of the present innovation.

Turning now to FIG. 5, it is seen that in various embodiments of the present innovation, a failover module 18 of a failed server 12 at the main data center 16 issues a command to the SAN controller 20 associated with the SAN 14 of such main data center 16, where the command directs such SAN controller 20 to disable writes to the storage space of the failed server 12 at the main data center 16, and also identifies that the SAN 14 at 'the backup data center 16' is enabled to write to such storage space (501). Presumptively, the failover module issues a corresponding command to the SAN controller 20 associated with the SAN 14 of the local backup data center 16L, although such a corresponding command is of only peripheral interest to the various embodiments of the present innovation and therefore need not be examined further.

The translator 24 of the present innovation as interposed between the issuing failover module 18 and the receiving SAN controller 20 intercepts such command and recognizes that the command identifies 'the backup data center 16' without specificity (503). Accordingly, the translator 24 must determine the identification for the local backup data center 16L and issue a modified command with such identification for the local backup data center 16L.

In particular, and in various embodiments of the present innovation, the translator 24 queries the SAN 14 at the main data center 16 for a list including an identification of each SAN 14 at a backup data center 16 in the system 10, and for each identified SAN 14 in the list, whether communications between such SAN 14 and the SAN 14 of the main data center 16 are asynchronous or synchronous (505). Notably, and as was set forth above, the SAN 14 of the local backup data center 16L and the SAN 14 of the remote backup data center 16R should both be identified within the list, and are distinguishable because communications between the SAN 14 of the main data center 16 and the SAN 14 of the local backup data center 16L are synchronous, while communications between the SAN 14 of the main data center 16 and the SAN 14 of the remote backup data center 16R are asynchronous.

The translator 24 in response receives from the SAN 14 at the main data center 16 such a list (507), reviews same to locate therein the identified SAN 14 at a backup data center 16 in the system 10 whose communications with the SAN 14 of the main data center 16 are synchronous (509), and defines the located SAN 14 in the list as the SAN 14 at the local backup data center 16L. Thereafter, the translator modifies the command from the failover module 18 to the receiving SAN controller 20 of the SAN 14 at the main data center 16 such that the command directs such SAN controller 20 to disable writes to the storage space of the failed server 12 at such main data center 16, and also identifies with proper specificity that the located SAN 14, which is at the local backup data center 16L, is enabled to write to such storage space (511). The translator 24 may then transmit the modified command to the SAN controller 20 as if such command were sent directly by the failover module 18 (513), and the SAN controller 20 and the SAN 14 thereof proceeds accordingly.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods are provided for identifying the SAN 14 at the local backup data center 16L with specificity. A translator 24 is interposed between the failover module 18 that does not identify the SAN 14 at the local backup data center 16L with specificity and the SAN controller 20 at the SAN 14 of the main data center 16 such that the translator 24 receives a command from the failover module 18 and modifies such command to provide such specificity. The translator 24 queries the SAN 14 of the main data center 16 for information necessary to discern the SAN 14 of the local backup data center 16L, and based thereon so modifies the command from the failover module 18.

It should be appreciated that changes could be made to the embodiments described above without departing from the inventive concepts thereof. For example although as set forth above each SAN 14 of a backup data center 16 is distinguished by whether communications therewith are synchronous or asynchronous, other distinguishing features may be employed in alternate embodiments of the present innovation. Moreover, although as set forth above the translator 24 performs the actions necessary to determine the identity of the SAN 14 of the local backup data center 16L, such actions may instead be performed elsewhere, such as at the failover module 18 or the SAN controller 20, or even at both, in alternate embodiments of the present innovation. It should be understood, therefore, that this innovation is not limited to the particular embodiments disclosed, but it is intended to cover modifications within the spirit and scope of the present innovation as defined by the appended claims.

The invention claimed is:

1. A method implemented in connection with a data system having multiple data centers including a main data center, a first backup data center, and a second backup data center, each data center including a plurality of servers for processing data and a store for storing the processed data, each server of the main data center including a failover module for providing failover support to the server, the main data center further including a translator for assisting a failover module of a failed server at the main data center in implementing failover of the failed server to a corresponding server at the first backup data center, the method comprising the translator:

intercepting a command from the failover module of the failed server to the store of the main data center, where the command directs the store of the main data center to disable writes to particular storage space in such store of the main data center associated with the failed server, but does not identify with specificity which of the store of the first backup data center and the store of the second backup data center is enabled to write to such particular storage space;

determining an identification of the store of the first backup data center by querying the store at the main data center for a list including an identification of each store at a backup data center in the data system, and for each identified store an attribute thereof that is to be employed to distinguish the store of the first backup data center from the store of the second backup data center, receiving the list from the store at the main data center, and locating in the received list the identification of the store of the first backup data center based on the distinguishing attribute;

modifying the command from the failover module of the failed server to the store of the main data center based on the determined identification of the store of the first backup data center, where the modified command directs the store of the main data center to disable writes to the particular storage space in such store of the main data center associated with the failed server, and identifies with specificity that the store of the first backup data center is enabled to write to such particular storage space; and transmitting the modified command to the store of the main data center as if such modified command were sent directly by the failover module such that the store can proceed in accordance with the modified command.

2. The method of claim 1 wherein the first backup data center is a local backup data center in synchronous communication with the main data center, and wherein the second backup data center is a remote backup data center in asynchronous communication with the main data center.

3. The method of claim 1 wherein the first backup data center is distinguished from the second backup data center based on the first backup data center being in synchronous communication with the main data center and the second backup data center being in asynchronous communication with the main data center.

4. The method of claim 1 wherein each store is a storage area network (SAN) including a SAN controller for controlling the SAN.

5. The method of claim 1 wherein each store is a storage area network (SAN) including a SAN controller for controlling the SAN, and wherein the command from the failover module is directed to the SAN controller of the main data center.

6. The method of claim 1 wherein the translator intercepts all commands from the failover module of the failed server to the store of the main data center and passes through each intercepted command to the store of the main data center except for the command that directs the store of the main data center to disable writes to particular storage space in the store of the main data center associated with the failed server, but does not identify with specificity which of the store of the first backup data center and the store of the second backup data center is enabled to write to such particular storage space.

7. A non-transitory computer-readable medium having computer-executable instructions thereon implementing a method in connection with a data system having multiple data centers including a main data center, a first backup data center, and a second backup data center, each data center including a plurality of servers for processing data and a store for storing the processed data, each server of the main data center including a failover module for providing failover support to the server, the main data center further including a translator for assisting a failover module of a failed server at the main data center in implementing failover of the failed server to a corresponding server at the first backup data center, the method comprising the translator:

intercepting a command from the failover module of the failed server to the store of the main data center, where the command directs the store of the main data center to disable writes to particular storage space in the store of the main data center associated with the failed server, but does not identify with specificity which of the store of the first backup data center and the store of the second backup data center is enabled to write to such particular storage space;

determining an identification of the store of the first backup data center by querying the store at the main data center for a list including an identification of each store at a backup data center in the data system, and for each identified store an attribute thereof that is to be employed to distinguish the store of the first backup data center from the store of the second backup data center, receiving the list from the store at the main data center, and locating in the received list the identification of the store of the first backup data center based on the distinguishing attribute;

modifying the command from the failover module of the failed server to the store of the main data center based on the determined identification of the store of the first backup data center, where the modified command directs the store of the main data center to disable writes to the particular storage space in the store of the main data center associated with the failed server, and identifies with specificity that the store of the first backup data center is enabled to write to such particular storage space; and transmitting the modified command to the store of the main data center as if such modified command were sent directly by the failover module such that the store can proceed in accordance with the modified command.

8. The medium of claim 7 wherein the first backup data center is a local backup data center in synchronous communication with the main data center, and wherein the second backup data center is a remote backup data center in asynchronous communication with the main data center.

9. The medium of claim 7 wherein the first backup data center is distinguished from the second backup data center based on the first backup data center being in synchronous communication with the main data center and the second backup data center being in asynchronous communication with the main data center.

10. The medium of claim 7 wherein each store is a storage area network (SAN) including a SAN controller for controlling the SAN.

11. The medium of claim 7 wherein each store is a storage area network (SAN) including a SAN controller for controlling the SAN, and wherein the command from the failover module is directed to the SAN controller of the main data center.

12. The medium of claim 7 wherein the translator intercepts all commands from the failover module of the failed server to the store of the main data center and passes through each intercepted command to the store of the main data center except for the command that directs the store of the main data center to disable writes to particular storage space in the store of the main data center associated with the failed server, but does not identify with specificity which of the store of the first backup data center and the store of the second backup data center is enabled to write to such particular storage space.

13. A translator implemented in connection with a data system having multiple data centers including a main data center, a first backup data center, and a second backup data center, each data center including a plurality of servers for processing data and a store for storing the processed data, each server of the main data center including a failover module for providing failover support to the server, the translator for assisting a failover module of a failed server at the main data center in implementing failover of the failed server to a corresponding server at the first backup data center, the translator comprising:

a subsystem that intercepts a command from the failover module of the failed server to the store of the main data center, where the command directs the store of the main data center to disable writes to particular storage space in the store of the main data center associated with the failed server, but does not identify with specificity which of the store of the first backup data center and the store of the second backup data center is enabled to write to such particular storage space;

a subsystem that determines an identification of the store of the first backup data center that includes a subsystem that queries the store at the main data center for a list including an identification of each store at a backup data center in the data system, and for each identified store an attribute thereof that is to be employed to distinguish the store of the first backup data center from the store of the second backup data center, a subsystem that receives the list from the store at the main data center, and a subsystem that locates in the received list the identification of the store of the first backup data center based on the distinguishing attribute;

a subsystem that modifies the command from the failover module of the failed server to the store of the main data center based on the determined identification of the store of the first backup data center, where the modified command directs the store of the main data center to disable writes to the particular storage space in the store of the main data center associated with the failed server, and identifies with specificity that the store of the first backup data center is enabled to write to such particular storage space; and a subsystem that transmits the modified command to the store of the main data center as if such modified command were sent directly by the failover module such that the store can proceed in accordance with the modified command.

14. The translator of claim 13 wherein the first backup data center is a local backup data center in synchronous communication with the main data center, and wherein the second backup data center is a remote backup data center in asynchronous communication with the main data center.

15. The translator of claim 13 wherein the first backup data center is distinguished from the second backup data center based on the first backup data center being in synchronous communication with the main data center and the second backup data center being in asynchronous communication with the main data center.

16. The translator of claim 13 wherein each store is a storage area network (SAN) including a SAN controller for controlling the SAN.

17. The translator of claim 13 wherein each store is a storage area network (SAN) including a SAN controller for controlling the SAN, and wherein the command from the failover module is directed to the SAN controller of the main data center.

18. The translator of claim 13 wherein the translator intercepts all commands from the failover module of the failed server to the store of the main data center and passes through each intercepted command to the store of the main data center except for the command that directs the store of the main data center to disable writes to particular storage space in the store of the main data center associated with the failed server, but does not identify with specificity which of the store of the first backup data center and the store of the second backup data center is enabled to write to such particular storage space.

* * * * *